Patented Dec. 29, 1925.

1,567,609

UNITED STATES PATENT OFFICE.

JOHN R. MacMILLAN, OF LA SALLE, NEW YORK, ASSIGNOR TO NIAGARA ALKALI COMPANY, OF NIAGARA FALLS, NEW YORK, A CORPORATION OF NEW YORK.

PROCESS OF MAKING THIN BOILING STARCH.

No Drawing. Application filed December 11, 1922. Serial No. 606,315.

*To all whom it may concern:*

Be it known that I, JOHN R. MACMILLAN, a citizen of the United States, residing at La Salle, in the county of Niagara and State of New York, have invented certain new and useful Improvements in Processes of Making Thin Boiling Starch, of which the following is a specification.

This invention relates to processes of making thin boiling starch; and it comprises a method of so improving starch as to render it capable of making a starch preparation which is fluid or thin when cold, which comprises treating starch with a small amount of chlorin, the chlorin-treated starch being usually treated with a little ammonia or admixed with a small amount of another alkali subsequent to the chlorin treatment; all as more fully hereinafter set forth and as claimed.

Starch preparations for starching clothes in the laundry, etc. made by boiling up starch with water and of the proper consistency while hot have the inconvenient property on cooling of becoming too thick for use. In order to remedy this inconvenience, it is a common practice to produce a slight degree of alteration or hydrolysis of the starch in the starch granule by treatment with a little acid, frequently hydrochloric acid. Starches so treated are customarily known as "thin boiling starches", since on treating in the laundry in the same way as natural or unmodified starch they give a thinner starch preparation which can be used at lower temperatures than can the preparations made by boiling ordinary starch with water. There are some inconveniences in the method of using acids for this purpose; neither are the preparations as good as could be desired.

In making these preparations with acids, it has always been presumed that the action was hydrolitic; that the action was one of the same nature which would, if not arrested, ultimately lead to the production of dextrins and dextrose (glucose). Hydrolytic actions of this nature with regard to starch are a common property of the acids or bodies containing the H ion.

Rather unexpectedly, I have found that dry chlorin exercises an action upon starch which makes it capable of giving thin-boiling starch preparations. I am at present unaware of the precise chemical action which takes place and content myself with noting the result, without speculating as to the theory. While in the presence of moisture, chlorin hydrolyzes, giving acids which would of course exercise the ordinary hydrolytic action, I have found that the treatment with chlorin works better if the materials are at least reasonably dry; that is, the chlorin and the starch treated thereby are both dry enough to preclude any substantial amount of acid formation. No great amount of chlorin or prolonged treatment is necessary. A minutary contact, that is a contact lasting about a minute or so, of starch with chlorin at the normal temperature, of, say, 60–70° F. suffices to render the starch thin boiling. There is an incidental bleaching action which is also advantageous, since it permits starches of rather yellowish hue to be used. Such starches are bleached and rendered suitable as regards color in addition to being made thin boiling.

The chlorin used may be the commercial liquid chlorin and may be blown over or through the starch in gaseous form. Different starches vary somewhat in their susceptibility to chlorin and it is often a useful expedient to dilute the chlorin with a controlled proportion of air. The more air, the less intense the action, and vice versa. Starches treated in the manner described, are not only rendered more useful for laundry purposes, but also for making the "vegetable glues" (apparatin, etc.). After the treatment of the starch with chlorin, it is a useful expedient to use an anti-chlor. A little ammonia, as gas or liquid, will serve well. Or a small amount of sodium bicarbonate or other convenient alkali may be admixed with the chlorin-treated starch.

The fact that the starch is treated in the dry condition renders the process very convenient in technical use.

In commercial embodiments of the present process, I ordinarily employ the commercial liquefied chlorin which can be obtained in tanks or cylinders. The liquid chlorin is dry, rarely containing more than, say, 0.2 per cent $H_2O$, and on regasification gives a gas sufficiently dry for my purposes. The liquid chlorin may be gasified in any of the commercial apparatus used for that purpose; the gaseous chlorin formed being metered, if desired. The starch may be air-dried commercial starch, but it is advantageous to heat it somewhat to dry it still further. The starch and chlorin may be brought into mutual contact in any convenient type of apparatus. The starch may, for example, be allowed to fall through an atmosphere of chlorin, or of air containing chlorin, in a suitable closed container, or the starch may be fed into a moving stream of chlorin, or of gas containing chlorin, and carried forward with it for a time. The time of contact and the concentration of chlorin used will vary according to the particular starch. With most starches, however, about a minute's contact at the normal temperature with a gas containing 50 per cent chlorin and upwards will suffice. After the chlorin treatment, the starch may be passed through a chamber containing some ammonia in the gaseous condition. The dry starch may be passed in continuous movement first through a chamber wherein it is exposed to the action of air containing chlorin and then through another where it is exposed to air containing gaseous ammonia. Or the dry chlorinated starch may be mixed by suitable mechanical arrangements with a suitable amount of sodium bicarbonate or potassium bicarbonate, say, 0.1 per cent. Sodium sulfite, hyposulfite and other anti-chlors may be used in the same way.

For manufacturing purposes, it is convenient to work in the stated manner first exposing the dry starch for a short time, say, a minute or so, to an atmosphere rich in chlorin and then transferring the starch to a chamber containing ammonia gas. The starch may then be directly packaged and stored, shipped or used. The dry starch is not moistened in any way during the operation and no drying afterwards is necessary, although, as stated, it is frequently convenient to dry the starch somewhat preliminarily. The advisability of a preliminarily drying of course depends upon the particular grade of starch treated.

What I claim is:

1. The process of making thin boiling starch which comprises exposing dry starch to a minutary contact with gaseous chlorin.

2. The process of making thin boiling starch which comprises exposing dry starch to a minutary contact with geaseous chlorin and then treating said starch with an anti-chlor.

3. The process of making thin boiling starch which comprises exposing dry starch to a minutary contact with gaseous chlorin and then treating said starch with ammonia as an anti-chlor.

4. The process of making a modified starch or thin boiling starch which comprises treating dry starch first momentarily with gaseous chlorin and then with gaseous ammonia.

In testimony whereof, I have hereunto affixed my signature.

JOHN R. MacMILLAN.